United States Patent
Wallace et al.

[11] Patent Number: 5,938,708
[45] Date of Patent: Aug. 17, 1999

[54] VEHICLE COMPUTER SYSTEM HAVING A NON-INTERRUPT COOPERATIVE MULTI-TASKING KERNEL AND A METHOD OF CONTROLLING A PLURALITY OF VEHICLE PROCESSES

[75] Inventors: Jon Kelly Wallace, Redford; Todd Alan Witters, Westland; Dale Walter Karolak, Brighton, all of Mich.

[73] Assignee: TRW Inc., Lyndhurst, Ohio

[21] Appl. No.: 08/887,773

[22] Filed: Jul. 3, 1997

[51] Int. Cl.[6] .............................. G06F 15/00; G06F 9/46
[52] U.S. Cl. ............................... 701/48; 701/45; 395/677
[58] Field of Search ................................. 701/1, 36, 45, 701/48; 395/677, 737

[56] References Cited

U.S. PATENT DOCUMENTS

| | | | |
|---|---|---|---|
| 4,847,751 | 7/1989 | Nakade et al. | 395/677 |
| 5,046,041 | 9/1991 | Lecocq et al. | 395/862 |
| 5,170,343 | 12/1992 | Matsuda | 364/184 |
| 5,445,258 | 8/1995 | Bigley et al. | 192/85 V |
| 5,465,335 | 11/1995 | Anderson | 395/375 |
| 5,602,736 | 2/1997 | Toya et al. | 701/45 |
| 5,630,130 | 5/1997 | Perotto et al. | 395/677 |

OTHER PUBLICATIONS

A document entitled "MicroController eXecutive for the Motorola MC68HC11", Version 1.3. by A. T. Barrett & Associates, dated Apr. 1990.

*Primary Examiner*—Michael J. Zanelli
*Attorney, Agent, or Firm*—Tarolli, Sundheim, Covell, Tummino & Szabo

[57] ABSTRACT

A multitasking operating system (12) for controlling performance of a plurality of vehicle processes (24). A plurality of event queues (32) are provided, with each event queue corresponding to a process and having a priority. An event scheduler function (40) places events to be processed into the event queues (32). Each event queue (32) which has at least one event to be processed is an active event queue. An event fetch function (42) searches the event queues (32) for an active event queue having the highest priority, and retrieves an event for processing from that event queue. An event dispatcher function (52) dispatches the retrieved event to a state of the process (24) corresponding to the highest priority active event queue. The state is at least a portion of the corresponding process (24) and is associated with the processing of the retrieved event. The state is executed by a processor (20) to process the event. The execution is not interrupted because of any activity within the event queues. The kernel (18) regains control after execution of the state, and the processor (20) does not proceed (i.e., halted) to another state of the corresponding process (24) until the event dispatcher function (52) of the kernel dispatches a retrieved event to another state of the corresponding process.

18 Claims, 5 Drawing Sheets

VEHICLE COMPUTER SYSTEM HAVING A NON-INTERRUPT COOPERATIVE MULTI-TASKING KERNEL AND A METHOD OF CONTROLLING A PLURALITY OF VEHICLE PROCESSES

TECHNICAL FIELD

The present invention is generally directed to a vehicle computer, and is particularly directed to a system in which an operating system kernel controls execution of a plurality of vehicle processes.

BACKGROUND OF THE INVENTION

Vehicle computer systems control a multitude of vehicle components. Within the computer systems, data processors execute tasks to process events which arise. Single processor systems handle parallel execution of tasks for several processes via a multitasking approach. Multitasking is the execution of several tasks concurrently or in parallel. The tasks are executed logically at the same time, even though they may not be executed physically at the same time.

Within a single processor computer system, a multitasking operation is controlled by an executive or kernel of an operating system. The kernel acts as an interface between the central processing unit (hereinafter referred to as "CPU") and the tasks to be executed. The kernel schedules the execution of the tasks such that the CPU is shared between all of the tasks in the system. Accordingly, the kernel controls which task has "possession" of the CPU.

Possession of the CPU by a task such that the task is executed (run) is determined on the basis of priority and readiness levels assigned to each task. In general, the CPU continues to execute a task toward completion until another, higher priority, task "requests" to use the CPU. The running task is interrupted and "suspended", and the higher priority task is allowed to run. Interruption of a task may occur many times. When the higher priority tasks are eventually completed, the CPU is voluntarily surrendered. Accordingly, even though a lower priority task may be suspended many times before its completion, the task is eventually completed.

Tasks have several states. An active task is one that has control of the CPU and is being executed. Only one task is active at any given time on a multitasking CPU. An inactive task is one not being executed and which is not waiting to be executed (i.e., no events to process). A ready task is one which is waiting for CPU time (i.e., suspended or otherwise waiting to be executed). Upon occurrence of an event (e.g., generated by another task or by hardware), an associated task is upgraded to either the ready state or the active state, depending upon its priority. The kernel maintains a dynamic list or queue to organize the ready tasks so that they are executed in accordance with their priority.

Interruption of an active task by a higher priority task, such that the higher priority task becomes active, is referred to as context switching. This type of system is known in the art as an interrupt system. Context switching requires that the particulars (e.g., variables, etc.) of the interrupted task be saved to registers or another memory device such that the particulars may be restored at a later time when the task again becomes active. Thus, sufficient memory space needs to be provided. Also, the kernel frequently reviews whether a higher priority task has changed from an inactive state to a ready state (i.e., waiting to be executed) and thus should interrupt the currently active task. Accordingly, the throughput (i.e., the number of tasks executed per time period) of an interrupt-type system is limited by the associated functions of continuous priority review and context switching.

SUMMARY OF THE INVENTION

The present invention provides a computer system for preforming a plurality of vehicle system processes. Means place events to be processed into a plurality of event queues. Each of the event queues corresponds to a vehicle system process. Means retrieve an event from the queues. Means dispatch the retrieved event to a state of the corresponding vehicle system process. The state is at least a portion of the corresponding vehicle system process and is associated with the processing of the retrieved event.

Means execute the state of the corresponding vehicle system process for processing the retrieved event. Means halt further performance of the corresponding vehicle system process by not proceeding to another state of the corresponding vehicle system process until the means for dispatching dispatches a retrieved event to another state of the corresponding vehicle system process. Means execute a process which monitors at least one vehicle operating characteristic. The process which monitors processes at least one event which is not placed into the event queues. Means interrupt execution of a currently executing state of a vehicle system process corresponding to an event queue to permit execution of the process which monitors, and otherwise prevent interruption of the currently executing state.

The invention further provides a method for performing a plurality of vehicle system processes. The processes process events. The events to be processed are placed into a plurality of event queues. Each of the event queues corresponds to a vehicle system process. An event is retrieved from the event queues. The retrieved event is dispatched to a state of the corresponding vehicle system process. The state is at least a portion of the corresponding vehicle system process and is associated with the processing of the retrieved event.

The state of the corresponding vehicle system process is executed for processing the retrieved event. Further performance of the corresponding vehicle system process is halted by not proceeding to another state of the corresponding vehicle system process until a retrieved event is dispatched to another state of the corresponding vehicle system process. A process which monitors at least one vehicle operating characteristic is executed. The process which monitors processes at least one event which is not placed into the event queues. Execution of a currently executing state of a vehicle system process corresponding to an event queue is interrupted to permit execution of the process which monitors. Otherwise, interruption of the currently executing state is prevented.

BRIEF DESCRIPTION OF THE DRAWINGS

Further features and advantages of the present invention will become apparent to those skilled in the art to which the present invention relates from reading the following description with reference to the accompanying drawings, in which.

DESCRIPTION OF PREFERRED EMBODIMENT

Figure 1A:
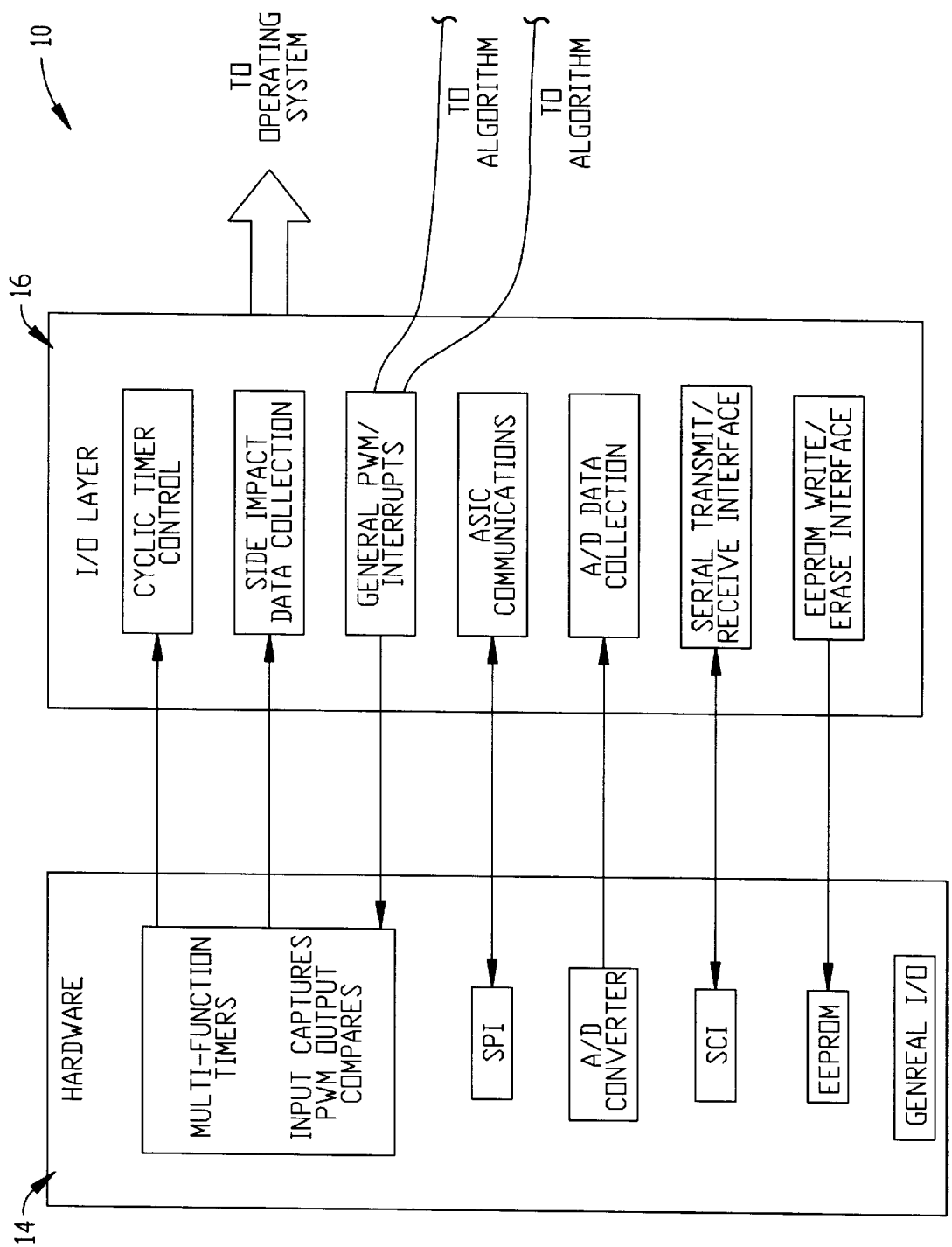
FIGS. 1A and 1B are schematic illustrations of a vehicle computer system having an operating system in accordance with the present invention.
Figure 1B:
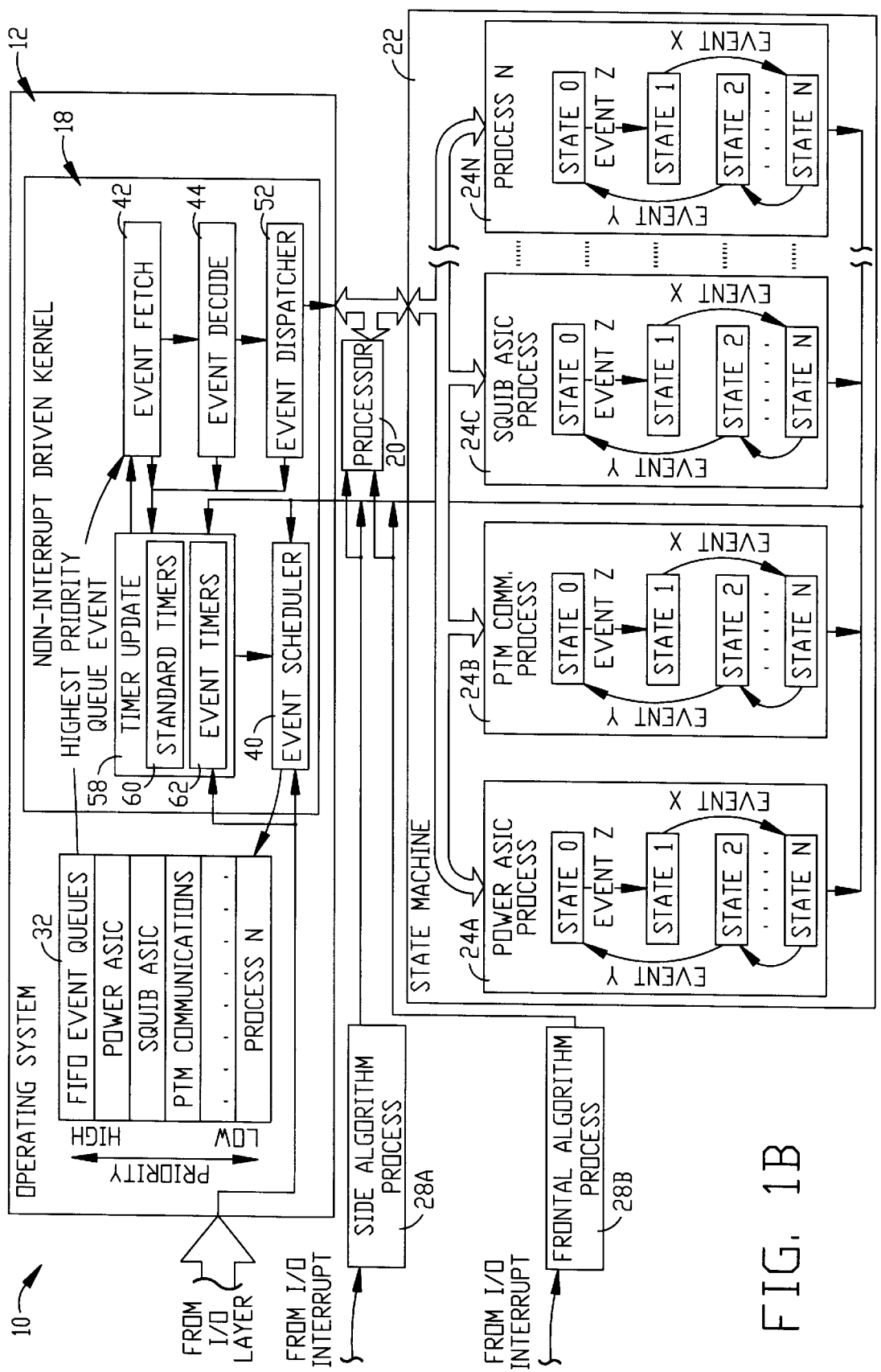

One representation of the present invention is schematically shown in FIGS. 1A and 1B as a vehicle computer system 10 which performs a plurality of vehicle processes. FIGS. 1A and 1B are to be viewed collectively to show the computer system 10. Hereinafter, FIGS. 1A and 1B are referred to collectively as FIG. 1.

The computer system 10 includes an operating system 12, several hardware devices 14, and an I/O layer 16. Any number of hardware devices 14 are included within the computer system 10. In the disclosed embodiment, the hardware devices 14 include devices for: multi-function timers and input captures having PWM output compares, an SPI serial communication network, an A/D converter function, an SCI serial communications network, an EEPROM function, and general I/O port functions.

The hardware devices 14 communicate with several functions within the I/O layer 16. Any number of functional aspects are included in the I/O layer 16. In the disclosed embodiment, the I/O layer functions include cyclic timer control, data collection, general PWM/interrupts, ASIC communications, A/D data collection, serial transmission and reception, and EEPROM writing and erasing.

The I/O layer 16 communicates with the operating system 12 and provides certain events (e.g., task requests) to the operating system. Within the operating system 12, the events are handled by a kernel 18 (i.e., an executive) of the operating system 12. Handling of the events is not the processing of the events to accomplish the requested tasks. Handling of the events is the preliminary organization and distribution of the events to cause efficient processing of the multitude of events which continuously occur within the computer system 10.

The operating system 12 communicates with a processor 20 (i.e., a CPU), and also communicates with a state machine 22, having a plurality of executable processes 24, within the computer system 10. The plurality of processes 24 are of any number and are identified in FIG. 1 as 24A–24N, respectively. Hereinafter, the processes 24A–24N are referred to collectively by the designation 24. Also, hereinafter, the discussion is generic to all of the processes 24A–24N. Thus, when one of the processes 24A–24N is discussed, a generic designation of 24 is used.

Each process 24 performs a specific vehicle function (e.g., control of a power ASIC, PTM communications, control of a squib ASIC), which is accomplished upon processing one or more events by execution of that process by the processor 20. Each of the processes 24 has a level of priority (i.e., urgency) compared to the other processes 24. The operating system 12 provides multitasking control over the execution of the several processes 24 by the processor 20.

The processor 20 also executes at least one process 28 which is used to determine whether the vehicle is involved in a incident (e.g., a vehicle collision) for which vehicle occupants are restrained to help protect the vehicle occupants. Restraint of the vehicle occupants is by air bags, seat belt pretensioners, etc., which are activatable responsive to the determination by the one process, 28. The one process 28 monitors one or more vehicle operating conditions or characteristics to determine whether the occupants are to be restrained.

For example, an accelerometer is used within the vehicle to provide a signal indicative of acceleration force on the vehicle. The one process 28 monitors the acceleration to determine if the acceleration exceeds a predetermined threshold, which is indicative of a vehicle collision. The disclosed example embodiment has two such processes 28, which are a side algorithm process 28A (lateral acceleration) and a frontal algorithm process 28B (travel direction acceleration). Hereinafter, the processes 28 are referred to collectively as the algorithm processes 28.

The algorithm processes 28 have a certain level of urgency because they are for vehicle occupant protection. The algorithm processes 28 have greater urgency than any of the processes 24 within the state machine 22. Hence, the algorithm processes 28 are accorded a priority over the processes 24 within the state machine 22.

The algorithm processes 28 are not within the state machine 22 and the events that are processed by the algorithm processes 28 are not handled by the kernel 18 of the operating system 12. The algorithm processes 28 are outside of the multitasking use of the processor 20. In the example shown in FIG. 1, the I/O layer 16 may trigger either algorithm process 28 to cause its immediate execution by the processor 20.

To accomplish multitasking of the processes 24 within the state machine 22, the processes 24 are divided into predefined portions or states. Hereinafter, the processes 24 are referred to as "state-driven processes 24". Each state within a state-driven process 24 is executable by the processor 20, and is executed to complete at least one task. Each break point (i.e., division point) between states within each state-driven process 24 is chosen at a or needs to wait for an event before the state-driven process can proceed. Further, each state is chosen such that the overall state-driven process 24 can be halted upon completion of the state without context switching.

When a state of a state-driven process 24 is being executed by the processor 20 (i.e., is active), the state has control over the processor. Once execution of the state is complete, the state relinquishes control of the processor 20 such that another state from the same state-driven process 24 or a different state-driven process, or a process not within the state machine can be executed by the processor. When a first state-driven process 24 is halted after completion of one of its states because the control of the processor 20 was relinquished to another process, the first state-driven process is resumed only when another one of its states is executed by the processor 20. Accordingly, within the processor 20, all of the states share the same stack space.

In determining break points for states of a process, the maximum amount of execution time that a state in a state-driven process may take is the result of the available CPU cycles which can be utilized by the operating system 12 to handle events, and the desired or acceptable amount of latency of the processing of an associated event by the state. The following equation illustrates the relationship of the maximum time for the execution of a state:
relationship of the maximum time for the execution of a state:

$$Statetime_{max} \cong (Eventlatency_{max}) \times \frac{Algglooptime - Algtime_{max}}{Algglooptime}$$

Wherein:
   Statetime$_{max}$=maximum amount of time that a state of a state-driven process may take;
   Eventlatency$_{max}$=maximum amount of acceptable latency of the processing of an event by a state;
   Alglooptime=rate at which the priority algorithm processes run; and Algtime$_{max}$=the maximum amount of time it takes to execute the priority algorithm processes.

When an event occurs, it is important that the event be processed within a reasonable amount of time. Event latency modeled by the following equation:

$$\Delta Eventlatency = (\Delta Algtime - T_1) + (statelength - T_2) + Kernel$$

Wherein:

ΔEventlatency=the delay in processing of the event;

ΔAlgtime=the time difference between the maximum Alglooptime and the minimum Alglooptime;

$T_1$=random variable between 0 and ΔAlgtime;

Statelength=the remaining length of the state that is executing when an event becomes available for processing;

$T_2$=random variable between 0 and Statelength; and

Kerneltime=the time it takes for the kernel to handle an event.

In order to handle the events which are to be processed by the state-driven processes 24, the kernel 18 includes means for defining a plurality of event queues 32. Each event queue 32 corresponds to one of the state-driven processes 24, and each event queue has a priority related to the priority of the corresponding state-driven process. Each event queue 32 holds one or more events which are to be processed by the corresponding state-driven process 24. An event queue 32 is active if it has at least one event which needs to be processed.

The kernel 18 includes several functions which are involved in the handling of the events. One of the functions is an event scheduler function 40 which places events into the event queues 32. Events which are placed into the event queues 32 come from several sources, including the I/O layer 16, other functions of the operating system 12, and the state-driven processes 24. Further, each event is placed into the event queue 32 which corresponds to the state-driven process 24 having the state for processing the event. Specifically, when the event scheduler function 40 is called to add an event to the event queues 32, the event scheduler function "looks up" the event in a master event table, and the event is placed in the event queue corresponding with the state-driven process 24 specified for that event. It is to be understood that an event may be placed into more than one event queue 32 if more than one state-driven process 24 is specified for that event.

The kernel 18 performs a sequence of functions in a continuous cycle to further handle the events which are now in the event queues 32. An event fetch function 42 searches through the event queues 32 to find the highest priority active event queue (i.e., the highest priority event queue which contains an event to be processed). The event fetch function 42 retrieves the oldest event from the highest priority active event queue. Specifically, for each event queue 32, retrieval of events from the queue is by a first in, first out (FIFO) rule.

Upon retrieval of an event, control within the kernel 18 passes from the event fetch function 42 to an event decode function 44. The particulars of the retrieved event are examined by the event decode function 44. Included within the particulars of the event is an identification (i.e., a process number) of the state-driven process 24 associated with the event queue 32 from which the event was retrieved.

Figure 2:
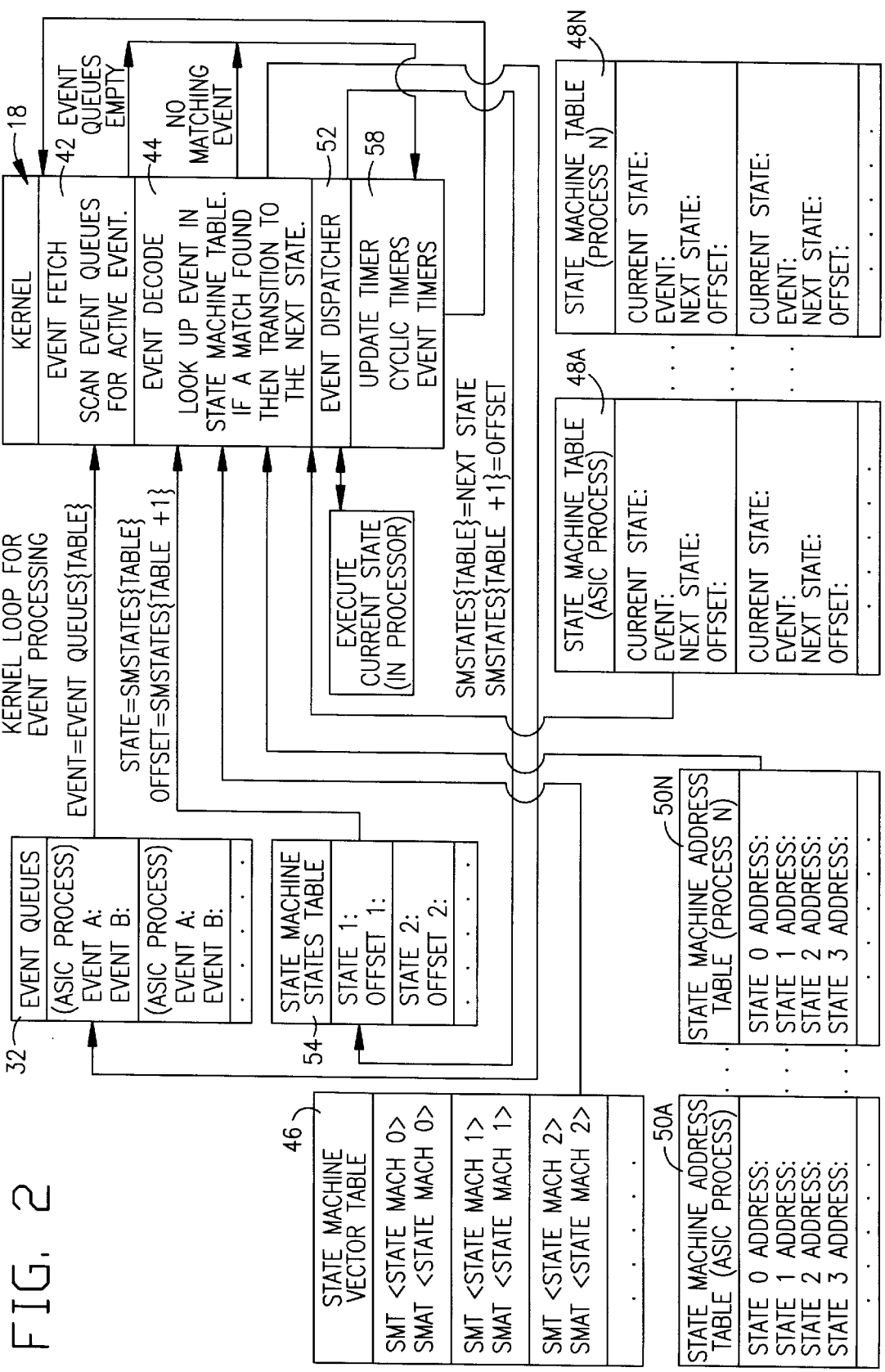
FIG. 2 is a diagram of the function of a kernel of the operating system shown in FIGS. 1A and 1B.

The event decode function 44 uses the process identification to point into a state machine vector table 46 (FIG. 2), in a ROM, to retrieve an address of a state machine table 48 and a state machine address table 50 associated with the respective state-driven process 24. The event decode function 44 also uses the process identification to look up the current state of the respective state-driven process 24. Event entries in the process' state machine table 48 are scanned by the event decode function 44. The event entries within the state machine table 48 contain information about one or more events that the state-driven process 24 is expecting. The event decode function 44 determines if information within the state machine table 48 matches corresponding information contained within the particulars for the retrieved event.

If the information matches, kernel control for the retrieved event passes to an event dispatcher function 52 of the kernel 18. The event dispatcher function 52 updates the current state in a state machine states table 54, i.e., the state which will process the retrieved event becomes the current state. The event dispatcher function 52 looks up the address of the function to be called in the state machine address table 48 for the state-driven process 24 containing the current state.

The event and the current state are passed to the processor 20 (FIG. 1). The processor 20 executes the current state to process the event. Once the current state is executed, the processor 20 communicates with the event dispatcher function 52 of the kernel 18 to inform the kernel of the completed execution of the current state.

Soon after an event is processed by execution of a state, the next event which is proceeding through handling by the kernel (i.e., retrieved from the highest priority event queue, matched with an associated state, etc.) is passed to the processor 20 along with the, now current, associated state such that the associated state is executed to process the event. Accordingly, the operation of the processor 20 to execute states is near continuous.

Events are continuously being placed into the event queues 32 by the event scheduler function 40, but, the execution of the current state by the processor 20 is not interrupted. Specifically, the execution of the current state is not interrupted by the occurrence, or the placement into the event queues 32, of an event for a state-driven process of higher priority than the state-driven process containing the currently executing state. The kernel 18 of the present invention acts as a barrier or buffer to prevent such interruption of the executing state. In particular, one aspect of the buffering action is provided by the event dispatcher function 52 awaiting completion of the execution of the current state before dispatching another event.

For each event transferred to the processor 20 for processing, a different state-driven process 24 may become active. In other words, when execution of a state is complete, the processor 20 does not automatically proceed to a subsequent state within the same state-driven process 24. Shifting operation among the several state-driven processes 24 depends upon the priority of the active event queues 32. Each state-driven process 24 which is partially complete (i.e., only some of the states of the process have been executed) is temporarily halted.

However, it is to be noted that each state which is passed to the processor 20 is completely executed by the processor so long as only state-driven processes 24 are awaiting execution of their states by the processor. Thus, it will be apparent to a person of ordinary skill in the art that the event queues 32 and the states of the state-driven process 24 are used by the kernel 18 to control the operation of the processor 20 in performing the state-driven processes. There is no context switching between the several state-driven processes 24 of the state machine 22 and information and particulars do not need to be saved to registers.

Within the kernel 18, upon receiving notice from the processor 20 of the completion of a state, the event dispatcher function 52 passes control to a timer update function 58 of the kernel 18. Within the timer update function 58, cyclic timers 60 and standard timers 62, if any previously set, are updated. Specifically, the cyclic timers 60 and any standard timers 62 are decremented toward zero.

Cyclic timers 60 are static timers that are defined at link time and are used to initiate certain processes at specific time intervals. Each cyclic timer 60 is associated with a cyclic event that the timer update function 58 creates using a timer and a ROM timer table that contains cycle time and event information. When a cyclic timer 60 expires, the timer update function 58 instructs the event scheduler function 40 to add the associated cyclic event into the event queues 32. After the cyclic event is scheduled, the respective cyclic timer 60 is reloaded with the cycle time from the ROM timer table.

Standard timers 62 are dynamic, i.e., the time duration is variable and is chosen upon setting of the timer. The duration can be different each time the timer is set. Standard timers 62 may be set by the state-driven processes 24 to cause addition of timed events into the event queues 32. The standard timers 62 may also be set through an operating system user interface, e.g., through the I/O layer 16. Similar to the cyclic timer 60, when a standard timer 62 expires, the timer update function 58 instructs the event scheduler function 40 to add the associated event into the event queues 32. Unlike the cyclic timers, once the associated event is added to the event queues 32, the standard timer is not automatically "reloaded". The standard timer 62 are set from outside the timer update function 58.

When the timer update function 58 completes the updating of the cyclic and standard timers 60 and 62, the kernel 18 passes control to the event fetch function 42 to begin handling of another event. If none of the event queues 32 are active (i.e., no events are present within any of the event queues), kernel control passes right back to the timer update function 58 of the kernel 18.

If an event is retrieved from the event queues 32 and if the information contained within the particulars for the retrieved event does not match information within the event entries in the process' state machine table 48, the event decodes function 44 disregards and discards the retrieved event. When an event is discarded, kernel control does not pass to the event dispatcher function 52. Instead, kernel control passes to the timer update function 58.

If an event for one of the algorithm processes 28 occurs, the event is not placed within the event queues 32. A communication is sent to the processor 20 to suspend the state which is currently being executed by the processor. The executing state and the associated event, which is currently being processed, are saved (i.e., stored within registers). The algorithm process 28 is executed by the processor 20, and the event which caused the algorithm process to be activated is processed. Upon complete execution of the algorithm process 28, the processor resumes execution of the suspended state to finish processing of the associated event. Upon completion of the execution of the suspended state, the processor signals the event dispatcher function 52 of the kernel 18 regarding the completion. The handling of the events from the event queues 32 and the processing of the events via execution of states of the state-driven processes continues.

Figure 3:
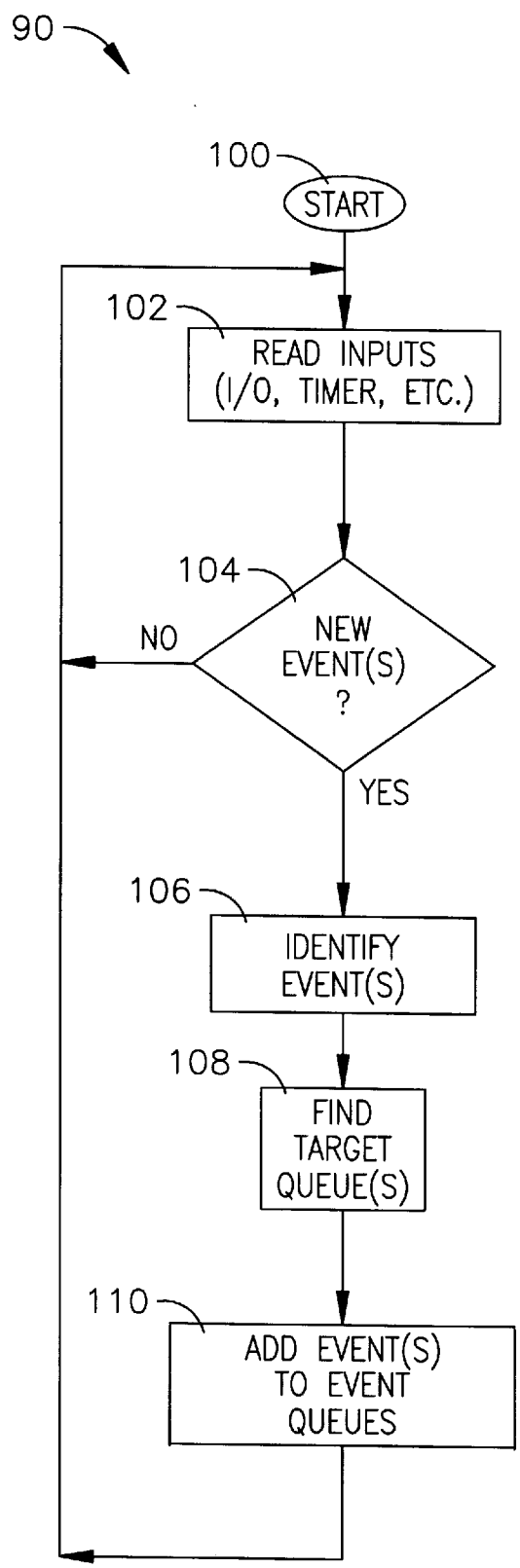
FIG. 3 is a flowchart for an event scheduling procedure which occurs within the function of the kernel of FIG. 2.

An example of a procedure 90 performed within the event scheduler function 40 of the kernel 18 will be appreciated upon viewing FIG. 3. The procedure 90 is initiated at step 100 and goes to step 102. At step 102, various inputs are read. The inputs are from the I/O layer 16, the timer update function 58, the state-driven processes 24 of the state machine 22, the algorithm processes 28 and other sources.

At step 104 of the procedure 90 it is determined whether any new events are present at the inputs. If the determination at step 104 is affirmative, the procedure 90 goes to step 106 where the events are identified. For each event, at step 108, a target event queue 32 is determined based upon the event (e.g., which input provided the event). At step 110, each event is added to the appropriate event queue 32. The procedure 90 then goes to step 102. If the determination at step 104 is negative (i.e., no new events are found after reading the events at step 102), the procedure 90 goes to step 102.

Figure 4:
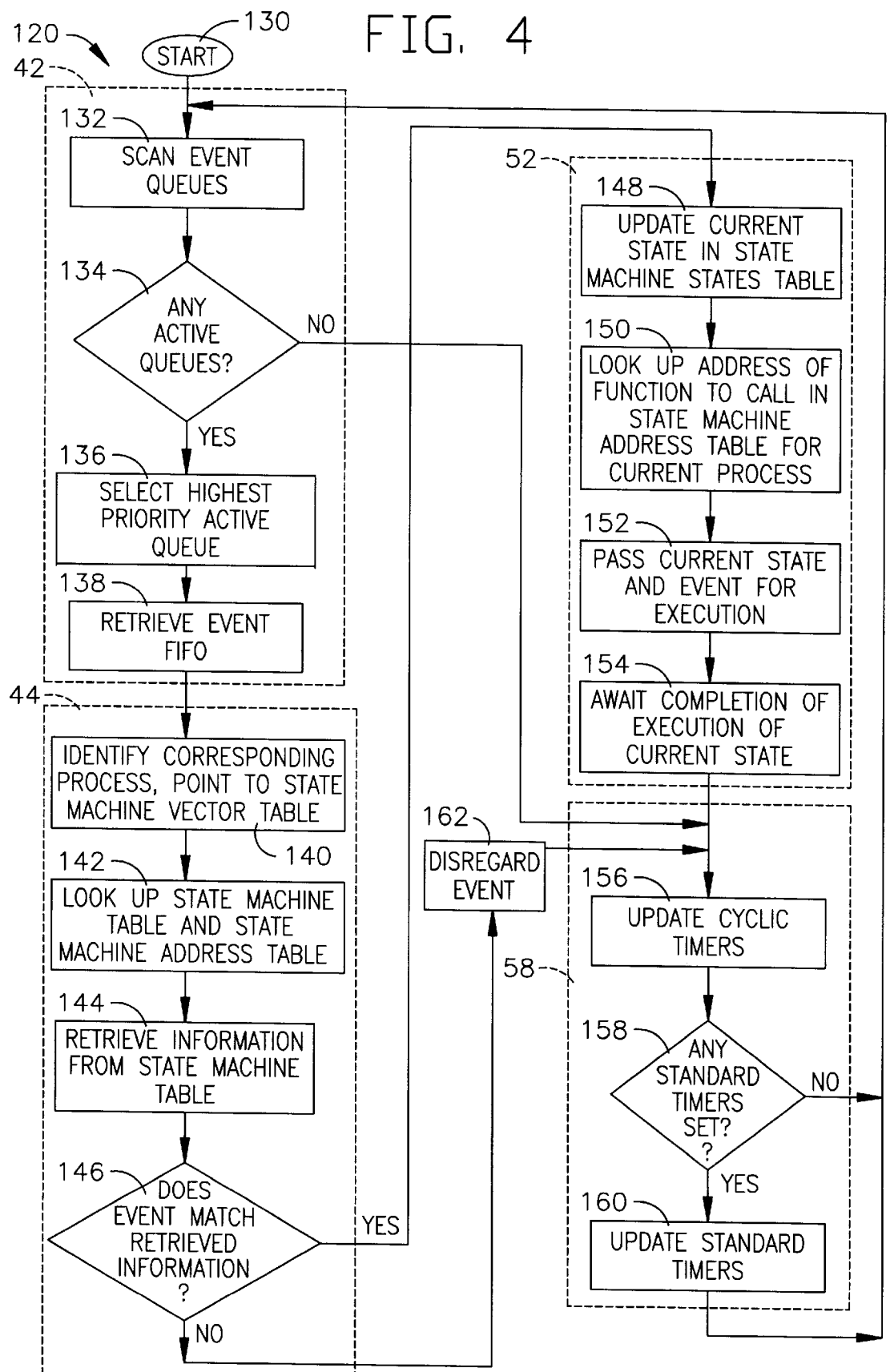
FIG. 4 is a flowchart for an event handling procedure which occurs within the function of the kernel of FIG. 2.

An example of a procedure 120 performed within the kernel 18 by the event fetch function 42, the event decode function 44, the event dispatcher function 52 and the timer update function 58 will be appreciated upon viewing FIG. 4. The procedure 120 is initiated at step 130 and goes to step 132. At step 132, the event queues 32 are scanned. At step 134 it is determined whether any of the event queues 32 are active (i.e., whether an event is found within any of the event queues). If the determination at step 134 is affirmative, the procedure 120 goes to step 136 where the highest priority active event queue is selected. At step 138, the oldest event within the highest priority active event queue 32 is retrieved (i.e., the event is retrieved based upon FIFO rules). It will be appreciated that steps 132–138 are performed by the event fetch function 42 of the kernel 18.

The procedure 120 goes from step 138 to step 140 where an identification of the state-driven process 24 which will have a state executed to process the retrieved event is determined. Also at step 140, the identification is used to point into the state machine vector table 46 (for the state machine table 48 and the state machine address table 50). At step 142, the state of the state-driven process 24 is looked up in the associated state machine table 48. At step 144, information is retrieved from the state machine table 48. At step 146 it is determined whether the information from the state machine table 48 matches the corresponding information for the retrieved event. If the determination at step 146 is affirmative the procedure 120 goes to step 148. It will be appreciated that steps 140–146 are performed by the event decode function 44 of the kernel 18.

At step 148, the current state in the state machine states table 54 is updated. At step 150, the address of the function to call in the state machine address table 50 is determined. At step 152, the current state and the event are passed to the processor 20 for execution of the state to process the event. At step 154, the kernel 18 awaits completion of execution of the current state by the processor 20. Upon completion of step 154, the procedure' 120 goes to step 156. It will be appreciated that steps 148–154 are performed by the event dispatcher function 52 of the kernel 18.

At step 156, the cyclic timers 60 are updated. At step 158, it is determined whether any standard timers 62 are set. If the determination at step 158 is affirmative, the procedure 120 goes to step 160 wherein the standard timers 62 are updated. Upon completion of step 160, the procedure goes to step 132. It will be appreciated that steps 156–160 are accomplished by the timer update function 58 of the kernel 18.

Several occurrences will cause the procedure 120 to jump forward, from one step to another step. For example, if the determination at step 134 is negative, (i.e., none of the event queues contains an event which needs to be processed), the procedure 120 of the kernel 18 jumps to step 156 (i.e., jumps to the timer update function 58). Also, upon a negative determination at step 146 (i.e., the information retrieved from the state machine table 48 does not match information for the retrieved event), the procedure 120 of the kernel 18 goes to step 162. At step 162 the retrieved event is discarded and the procedure goes to step 156 (i.e., to the timer update function 58). Also, if the determination at step 158 is negative, (i.e., there are no standard timers to update), the procedure 120 goes to step 132.

From the above description of the invention, those skilled in the art will perceive improvements, changes and modifications. Such improvements, changes and modifications within the skill of the art are intended to be covered by the appended claims.

Having described the invention, the following is claimed:

1. A computer system for performing a plurality of vehicle system processes, said computer system comprising:

means for placing events to be processed into a plurality of event queues, each of said event queues corresponding to a vehicle system process;

means for retrieving an event from said event queues;

means for dispatching said retrieved event to a state of the corresponding vehicle system process, said state being at least a portion of said corresponding vehicle system process and being associated with the processing of said retrieved event;

means for executing said state of said corresponding vehicle system process for processing said retrieved event;

means for halting further performance of said corresponding vehicle system process by not proceeding to another state of said corresponding vehicle system process until said means for dispatching dispatches a retrieved event to another state of said corresponding vehicle system process;

means for executing a process which monitors at least one vehicle operating characteristic, said process which monitors processing at least one event which is not placed into said event queues; and means for interrupting execution of a currently executing state of a vehicle system process corresponding to an event queue to permit execution of said process which monitors, and for otherwise preventing interruption of said currently executing state.

2. A system as set forth in claim 1, wherein said means for otherwise preventing interruption of said currently executing state includes means for preventing interruption because of the placement of any event into said event queues.

3. A system as set forth in claim 1, wherein said means for halting uses said event queues and said states of said corresponding process to control progression of performance of said corresponding process.

4. A system as set forth in claim 1, wherein said process which monitors at least one vehicle operating characteristic is a process for determining whether the vehicle is involved in a collision, said means for executing a process which monitors at least one vehicle operating characteristic executes said process for determining whether the vehicle is involved in a collision.

5. A system as set forth in claim 4, wherein said vehicle operating characteristic is a vehicle acceleration indicative signal, said process which monitors at least one vehicle operating characteristic determines whether the vehicle acceleration is indicative of a vehicle collision.

6. A system as set forth in claim 1, including means for storing information regarding events, states and processes, including information indicating a relationship between each state and at least one event to be processed by said each state.

7. A system as set forth in claim 6, including means for comparing information stored within said means for storing information with information from said retrieved event, and means for determining whether said retrieved event should be dispatched to a state.

8. A system as set forth in claim 6, wherein said means for storing information includes a state machine vector table, state machine address tables, and state machine tables.

9. A system as set forth in claim 1, including means for monitoring a time period extending from a previous execution of at least one certain process, means for determining whether said at least one certain process should be executed in response to said monitored time period, and means for creating an event to cause initiation of said at least one certain process in response to said determination of said means for determining.

10. A method for performing a plurality of vehicle system processes, the processes process events, said method comprising:

placing events to be processed into a plurality of event queues, each of the event queues corresponding to a vehicle system process;

retrieving an event from the event queues;

dispatching the retrieved event to a state of the corresponding vehicle system process, the state being at least a portion of the corresponding vehicle system process and being associated with the processing of the retrieved event;

executing the state of the corresponding vehicle system process for processing the retrieved event;

halting further performance of the corresponding vehicle system process by not proceeding to another state of the corresponding vehicle system process until the means for dispatching dispatches a retrieved event to another state of the corresponding vehicle system process;

executing a process which monitors at least one vehicle operating characteristic, the process which monitors processing at least one event which is not placed into the event queues; and interrupting execution of a currently executing state of a vehicle system process corresponding to an event queue to permit execution of the process which monitors, and for otherwise preventing interruption of the currently executing state.

11. A method as set forth in claim 10, wherein said step of otherwise preventing interruption of the currently executing state includes preventing interruption because of the placement of any event into the event queues.

12. A method as set forth in claim 10, wherein said step of halting is accomplished by use of the event queues and the states of the corresponding process to control progression of performance of the corresponding process.

13. A method as set forth in claim 10, wherein the process which monitors at least one vehicle operating characteristic is a process for determining whether the vehicle is involved in a collision, said step of executing a process which monitors at least one vehicle operating characteristic executes the process for determining whether the vehicle is involved in a collision.

14. A method as set forth in claim 13, wherein the vehicle operating characteristic is a vehicle acceleration indicative signal, the process which monitors at least one vehicle operating characteristic determines whether the vehicle acceleration is indicative of a vehicle collision.

15. A method as set forth in claim 10, including storing information regarding events, states and processes, the stored information includes information indicating a relationship between each state and at least one event to be processed by the state.

16. A method as set forth in claim 15, including comparing stored information with information from the retrieved event, and determining whether the retrieved event should be dispatched to a state.

17. A method as set forth in claim 15, wherein the stored information is stored in a state machine vector table, state machine address tables, and state machine tables.

18. A method as set forth in claim 10, including monitoring a time period extending from a previous execution of at least one certain process, determining whether the at least one certain process should be executed in response to the monitored time period, and creating an event to cause initiation of the at least one certain process in response to the determination.

* * * * *